US009332392B1

(12) United States Patent
Conway et al.

(10) Patent No.: US 9,332,392 B1
(45) Date of Patent: May 3, 2016

(54) REMOTELY ACTIVATING A COMBINATION OF MOBILE DEVICE FUNCTIONS

(75) Inventors: David Conway, Los Altos, CA (US); Cynthia Wong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 807 days.

(21) Appl. No.: 13/493,555

(22) Filed: Jun. 11, 2012

(51) Int. Cl.
*H04W 4/02* (2009.01)

(52) U.S. Cl.
CPC .................................. *H04W 4/025* (2013.01)

(58) Field of Classification Search
CPC ........ H04W 4/02; H04W 4/025; H04W 64/00
USPC .................. 455/418–420, 550.1, 556.2, 90.1, 455/414.1, 456.1–456.6
See application file for complete search history.

(56) References Cited

U.S. PATENT DOCUMENTS

| 7,639,943 | B1 * | 12/2009 | Kalajan ......................... 396/429 |
| 7,873,349 | B1 * | 1/2011 | Smith et al. .................... 455/410 |
| 8,326,315 | B2 * | 12/2012 | Phillips et al. ............. 455/456.1 |
| 2009/0148074 | A1 * | 6/2009 | Xu et al. ........................ 382/313 |
| 2010/0130178 | A1 * | 5/2010 | Bennett et al. ............. 455/414.1 |
| 2010/0250136 | A1 * | 9/2010 | Chen ............................. 701/300 |
| 2011/0047341 | A1 * | 2/2011 | Yu et al. ........................ 711/162 |
| 2012/0155846 | A1 * | 6/2012 | Gilbert-Schachter et al. ............................. 396/106 |
| 2013/0045751 | A1 * | 2/2013 | Chao et al. ................. 455/456.1 |

* cited by examiner

*Primary Examiner* — Brandon Miller
(74) *Attorney, Agent, or Firm* — Troutman Sanders LLP; James E. Schutz; Andrew C. Doherty

(57) ABSTRACT

A method of remotely activating a combination of mobile device functions using a network application includes receiving, using the network application at a server, a client command from a client computer and sending an instruction to activate a combination of mobile device functions on the mobile device based on the client command. The method further includes receiving, at the server, information from the mobile device based on the activated combination of mobile device functions and sending client information to the client computer based on the received information from the mobile device.

8 Claims, 12 Drawing Sheets

REMOTELY ACTIVATING A COMBINATION OF MOBILE DEVICE FUNCTIONS

BACKGROUND

1. Field

The field relates to mobile devices.

2. Related Art

Various types of mobile devices can provide different types of input and output functions. Input functions allow the mobile device to capture and relay information about surroundings and output functions allow the mobile device to cause device configuration changes and changes in the surroundings. Mobile device users are increasingly encountering a variety of circumstances where the remote coordination of a combination of different mobile device functions could be helpful.

It can be difficult to enable and coordinate the remote activation of diverse features and functions on a mobile device. This coordination becomes even more difficult when a particular goal is sought by the user.

SUMMARY

Embodiments described herein relate to remotely activating, using a network application, a combination of mobile device functions. According to an embodiment, a method of remotely activating, using a network application, a combination of mobile device functions includes receiving, using the network application at a server, a client command from a client computer and sending an instruction to activate a combination of mobile device functions on the mobile device based on the client command. The method further includes receiving, at the server, information from the mobile device based on the activated combination of mobile device functions and sending client information to the client computer based on the received information from the mobile device.

According to another embodiment, a system for remotely activating a combination of mobile device functions on a mobile device includes a computer server, a client computer and a network application on the computer server configured to receive a client command from the client computer. A remote combination controller is configured to send an instruction to activate a combination of mobile device functions on the mobile device based on the client command and receive information from the mobile device based on the activated combination of mobile device functions and send client information to the client computer based on the received information from the mobile device.

Further features and advantages, as well as the structure and operation of various embodiments are described in detail below with reference to the accompanying drawings.

BRIEF DESCRIPTION OF THE FIGURES

The accompanying drawings, which are incorporated in and constitute part of the specification, illustrate embodiments and, together with the general description given above and the detailed description of embodiments given below, serve to explain the principles of the present disclosure. In the drawings.

DETAILED DESCRIPTION

The following detailed description refers to the accompanying drawings that illustrate exemplary embodiments. Other embodiments are possible, and modifications may be made to the embodiments within the spirit and scope of the disclosure. Therefore, the detailed description is not meant to limit the disclosure.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one having skill in the relevant art(s) that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Overview

Figure 1:
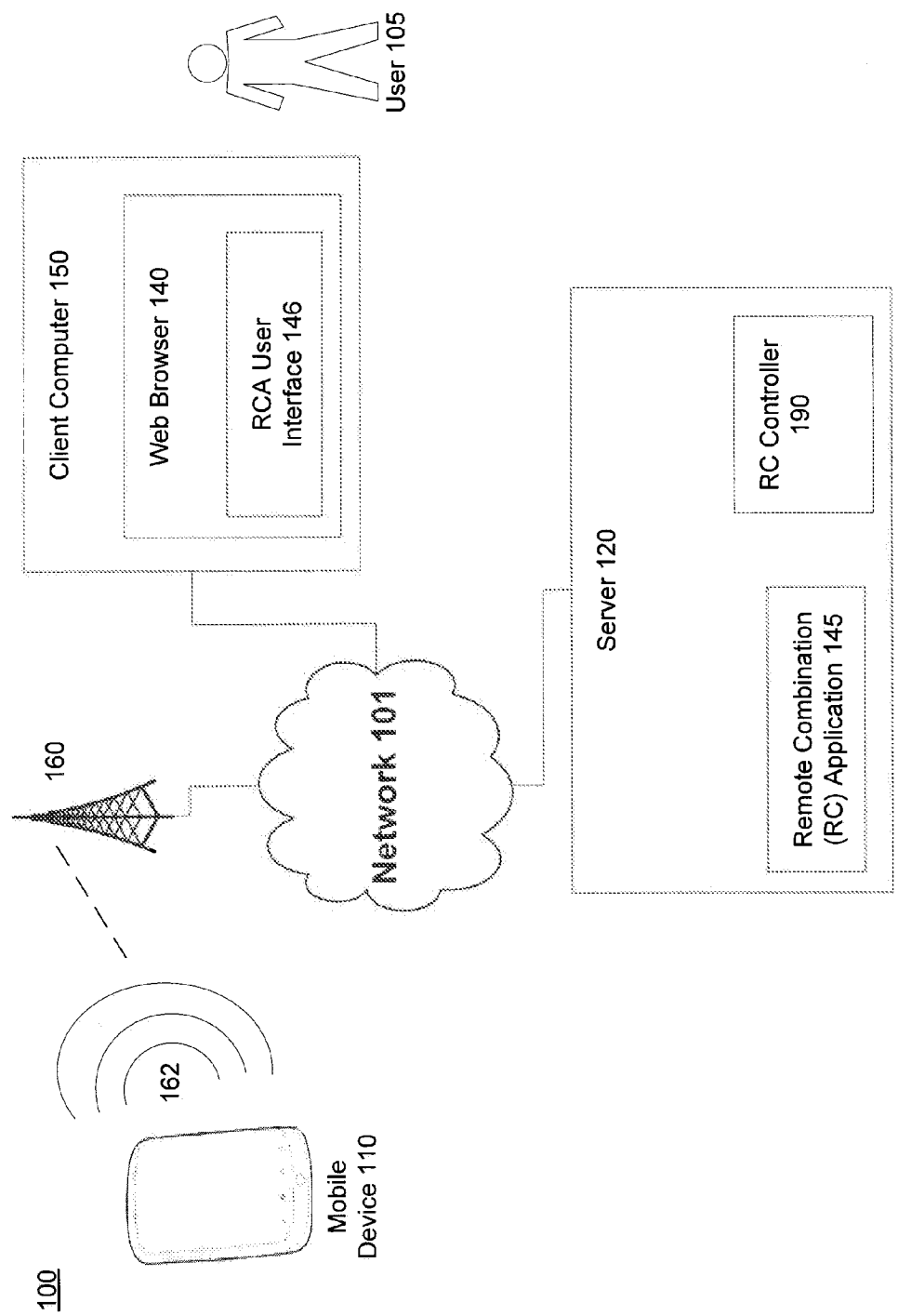
FIG. 1 is a block diagram depicting an example network application architecture, according to an embodiment.

FIG. 1 depicts an example network application architecture 100 in which embodiments, or portions thereof, may be implemented. Network application architecture 100 includes the following components linked by network 101: server 120, wireless transceiver 160 and client computer 150. Mobile device 110 is linked by wireless signal 162 to wireless transceiver 160. Client computer 150 includes web browser 140. Web browser 140 includes remote combination application user interface (RCA user interface) 146.

Generally speaking, some embodiments described herein enable a user to remotely activate a combination of mobile device functions using remote combination controller 190. The remote activation can be performed by sending an instruction from remote combination controller 190 to mobile device 110. The remote activation can be initiated and controlled using a network-based application controlled by the user, for example RC application 145 controlled by user 105 using RCA user interface 146. Different combinations of device functions can be used to further a variety of goals. Example goals are discussed below with respect to FIGS. 6-11.

As used herein, network 101 may be any network or combination of networks that can carry data communications. Such network 101 can include, but is not limited to, a local area network, medium area network, and/or wide area network such as the Internet. Network 101 can support protocols and technology including, but not limited to, World Wide Web protocols and/or services. Intermediate web servers, gateways, or other servers may be provided between components of the depicted network components depending upon a particular application or environment.

As used herein, mobile device 110 and other mobile devices discussed, may be any type of portable, microprocessor-based, user operated device. Typically, as used herein, mobile device 110 may refer to: a mobile phone, a smart phone or a tablet computer. An exemplary embodiment of mobile device 110 includes wireless connectivity through a broadband wireless network, for example mobile device 110 using wireless signal 162 to connect to network 101 via wireless transceiver 160.

As used typically herein, a network-based application is an application with functions distributed between two or more computers linked by a network. In an embodiment of a network-based application described herein, a combination of mobile device functions are activated and controlled by a network-based application, e.g., remote combination application 145. In this example, client computer 150 and server 120 are linked by network 101, for example, the Internet, and RCA user interface 146 is generated using a hypertext transfer protocol (HTTP) displayed with web browser 140. In different embodiments, different configurations, functions, networks and computers can be used.

In the embodiment shown on FIG. 1, RC application 145 is a web-browser 140 implemented network-based application, but it is important to note that the functions described herein performed by RC application 145 can be performed by standalone and non-browser based applications as well (not shown).

As would be appreciated by one having skill in the relevant art(s), network-based applications such as RC application 145 generally have a server-side component executing on a server, e.g., server 120. Server 120 has the host/server-side components of RC application 145, and links, via network 101 to components on mobile device 110 and client computer 150, for example RCA user interface 146. Further details regarding the operation of remote combination application 145, remote combination controller 190 and mobile device 110 are provided with respect to FIGS. 6-11 below, according to embodiments.

Mobile Device Functions

As discussed herein, mobile devices have a variety of functions, such functions being broadly classified herein as input functions and output functions. As used herein, input functions generally gather information, for example, sensors, microphones, cameras. Output functions cause the device to effect an external change on some part of its environment and/or an internal change to the device. Based on the illustrative list of input function components and output function components in FIGS. 2 and 3 respectively, one having skill in the relevant art(s), given the description herein, would be able to identify additional similar components, along with uses within embodiments.

Figure 2:
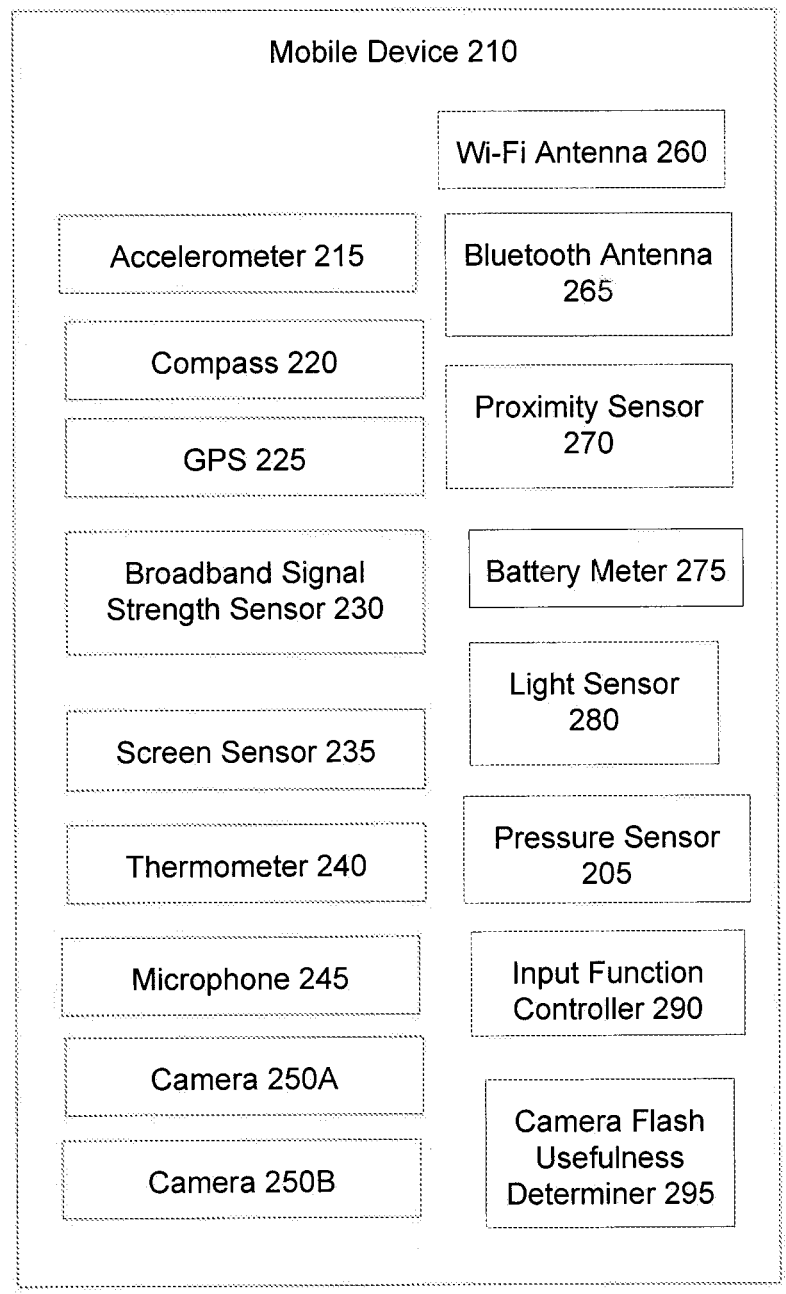
FIG. 2 is a block diagram of a more detailed view of input functions in a mobile device, according to an embodiment.

FIG. 2 is a detailed block diagram of mobile device 210 depicted having input functions, according to an embodiment. Mobile device 210 has input function controller 290 and several input function components: battery meter 275, accelerometer 215, compass 220, Global Positioning System (GPS) 225, broadband signal strength sensor 230, screen sensor 235, thermometer 240, microphone 245, cameras 250A-B, Wi-Fi antenna 260, Bluetooth antenna 265, camera flash usefulness determiner 295 and proximity sensor 270.

The following list of input function components IF1-IF13, as well as the input function components shown as part of mobile device 210 in FIG. 2, are intended to be non-limiting and illustrative of different input function components that can be used by embodiments. Input function components IF1-IF13 are as follows:

IF1. Accelerometer 215: As would be appreciated by one having skill in the relevant art(s), an accelerometer is an input component that measures the relative motion of the device.

IF2. Compass 220: As would be appreciated by one having skill in the relevant art(s), a compass is a navigational instrument for determining direction relative to the Earth's magnetic poles.

IF3. Global Positioning System Receiver (GPS) 225: As would be appreciated by one having skill in the relevant art(s), a GPS input component receives signals from a space-based global navigation satellite system (GNSS) and provides location and time information.

IF4. Broadband signal strength sensor 230: As would be appreciated by one having skill in the relevant art(s), a broadband signal strength sensor measures the strength of various broadband signals reaching the device.

IF5. Screen touch sensor 235: As would be appreciated by one having skill in the relevant art(s), a screen touch sensor senses a touch interaction with a device display screen.

IF6. Thermometer 240: As would be appreciated by one having skill in the relevant art(s), a thermometer measures the ambient temperature around the device.

IF7. Microphone 245: As would be appreciated by one having skill in the relevant art(s), a microphone is a sensor that converts sound into an electrical signal.

IF8. Cameras 250A-B: As would be appreciated by one having skill in the relevant art(s), a camera can capture either a still image or a video of a scene around the device.

IF9. Wi-Fi Antenna 260: As would be appreciated by one having skill in the relevant art(s), a Wi-Fi antenna receives signals encoded using the Wi-Fi communications standard.

IF10. Bluetooth Antenna 265: As would be appreciated by one having skill in the relevant art(s), a Bluetooth antenna receives signals encoded using the Bluetooth communications standard.

IF11. Proximity Sensor 270: As would be appreciated by one having skill in the relevant art(s), a proximity sensor measures the proximity of an object and/or person to a point on the device, e.g., the device screen.

IF12. Battery Meter 275: As would be appreciated by one having skill in the relevant art(s), a battery meter measures the remaining charge in the device battery.

IF13. Camera Flash Usefulness Determiner 295: As would be appreciated by one having skill in the relevant art(s), camera flash usefulness determiner can use information from light sensor 280 to determine whether the use of camera flash 335 would be likely to improve a visual representation captured by cameras 250A-B.

As would be appreciated by one having skill in the relevant art(s), given the description herein, different mobile devices in embodiments can have different input components for gathering information into mobile device 210. Input function controller 290 is a component used by an embodiment to control one or more input functions in mobile device 210.

Figure 3:
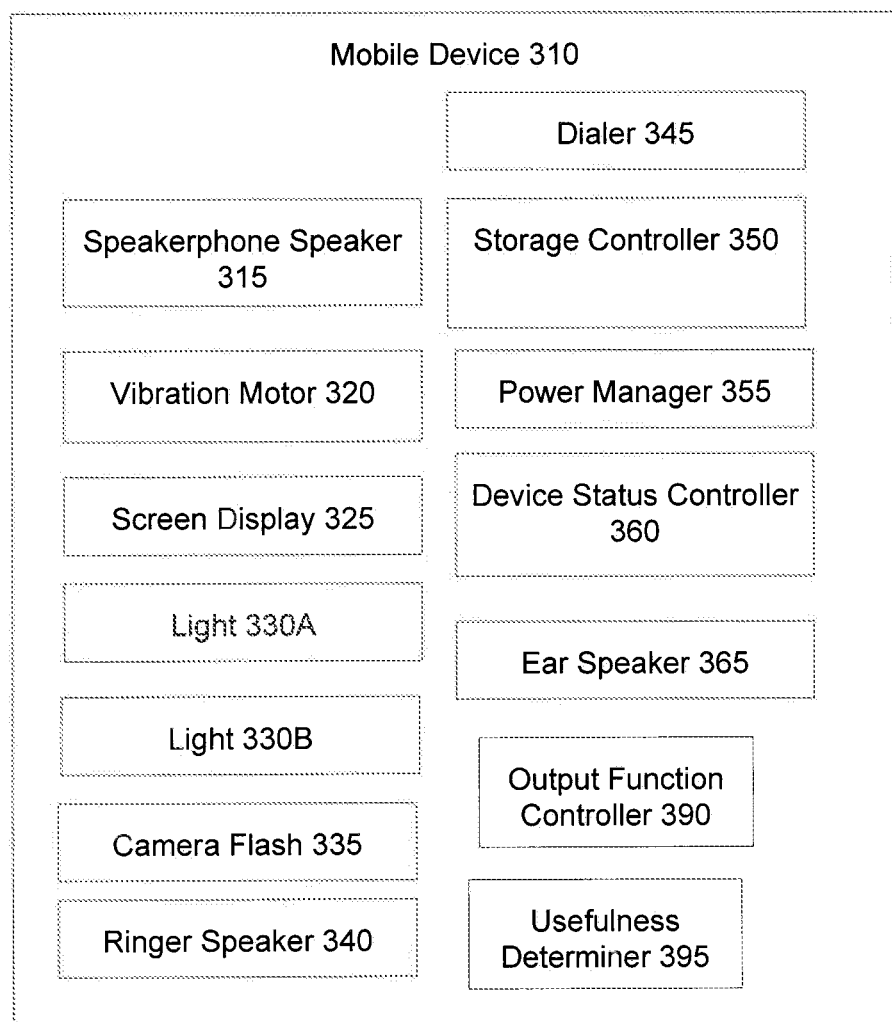
FIG. 3 is a block diagram of a more detailed view of output functions in a mobile device, according to an embodiment.

FIG. 3 is another detailed block diagram of mobile device 120, depicted having output functions, according to an embodiment. Mobile device 120 has output function controller 390 and several output function components: speakerphone speaker 315, vibration motor 320, screen display 325, lights 330A-B, camera flash 335, ringer speaker 340, dialer 345, storage controller 350, power manager 355, device status controller 360, usefulness determiner 395 and ear speaker 365.

The following list of output function components OF1-OF12, as well as the output function components shown as part of mobile device 310 in FIG. 3, is intended to be non-limiting and illustrative of different output function components that can be used by embodiments. Output function components OF1-OF12 are as follows:

OF1. Ear speaker 365: As would be appreciated by one having skill in the relevant art(s), an ear speaker is a speaker positioned on the device so that it can be placed next to the ear of the user.

OF2. Speakerphone speaker 315: As would be appreciated by one having skill in the relevant art(s), a speakerphone speaker on the device is generally used for presenting louder sounds than ear speaker 310.

OF3. Vibration motor 320: As would be appreciated by one having skill in the relevant art(s), a vibration motor is used by the device to cause a vibrating notification indication on the device, e.g., for silent notification of a pending received call.

OF4. Screen display 325: As would be appreciated by one having skill in the relevant art(s), a screen display (also known as a screen) is generally used to display a user interface on the device. This component may also be used for any type of visual/textual notification.

OF5. Lights 330A-B: As would be appreciated by one having skill in the relevant art(s), lights on the device can emit light for different purposes.

OF6. Camera flash 335: As would be appreciated by one having skill in the relevant art(s), a camera flash provides a short burst of additional light timed to improve a captured photo.

OF7. Ringer speaker 340: As would be appreciated by one having skill in the relevant art(s), a ringer speaker provides a notifying noise that alerts a user to a waiting phone call.

OF8. Dialer 345: As would be appreciated by one having skill in the relevant art(s), a dialer can dial a telephone component on a device.

OF9. Storage controller 350: As would be appreciated by one having skill in the relevant art(s), a storage controller manages the storage on a device. Functions that can be performed by this component include copying and erasing stored content on the device.

OF10. Power manager 355: As would be appreciated by one having skill in the relevant art(s), a power manager manages the power consumption by the device, especially consumption of battery power.

OF11. Device status controller 360: As would be appreciated by one having skill in the relevant art(s), a device status controller can control status aspects of a device, including whether the device is on or off, and whether the screen display is enabled.

OF12. Usefulness Determiner 395: This component analyzes characteristics of a captured visual representation to determine whether the representation is likely to be useful to determine a location of mobile device 310. Factors that suggest usefulness include whether the representation is of an outdoor scene, whether any text appears in the representation and whether it is daytime or nighttime in the scene.

As would be appreciated by one having skill in the relevant art(s), given the description herein, different mobile devices in embodiments can have different components for performing output functions generally and described herein. Output function controller 390 is a component used by an embodiment to control one or more output functions in mobile device 310.

The input, output and controller functions described herein need not be performed by separate components, rather the functions can be flexibly performed by different combinations of hardware and software components. Different implementation examples are discussed further below with respect to FIGS. 6-10.

Function Combinations Generally

The illustrative device input and output functions noted above are used, in different combinations by embodiments, controlled by a user with a network application, for example, RC application 145 from FIG. 1. Listed below are different feature combinations that use input and/or output feature components listed above with the descriptions of FIGS. 2 and 3. A user can select combinations to further a particular goal, though a goal does not need to be selected. The goal examples listed below can be useful when considering the purposes of activating different combinations of mobile device functions. The goals listed below also may be used on an embodiment of RCA user interface 146 to visually organize different combinations for user 105. An example of such an interface is discussed with, and depicted in, FIG. 5.

Figure 4:
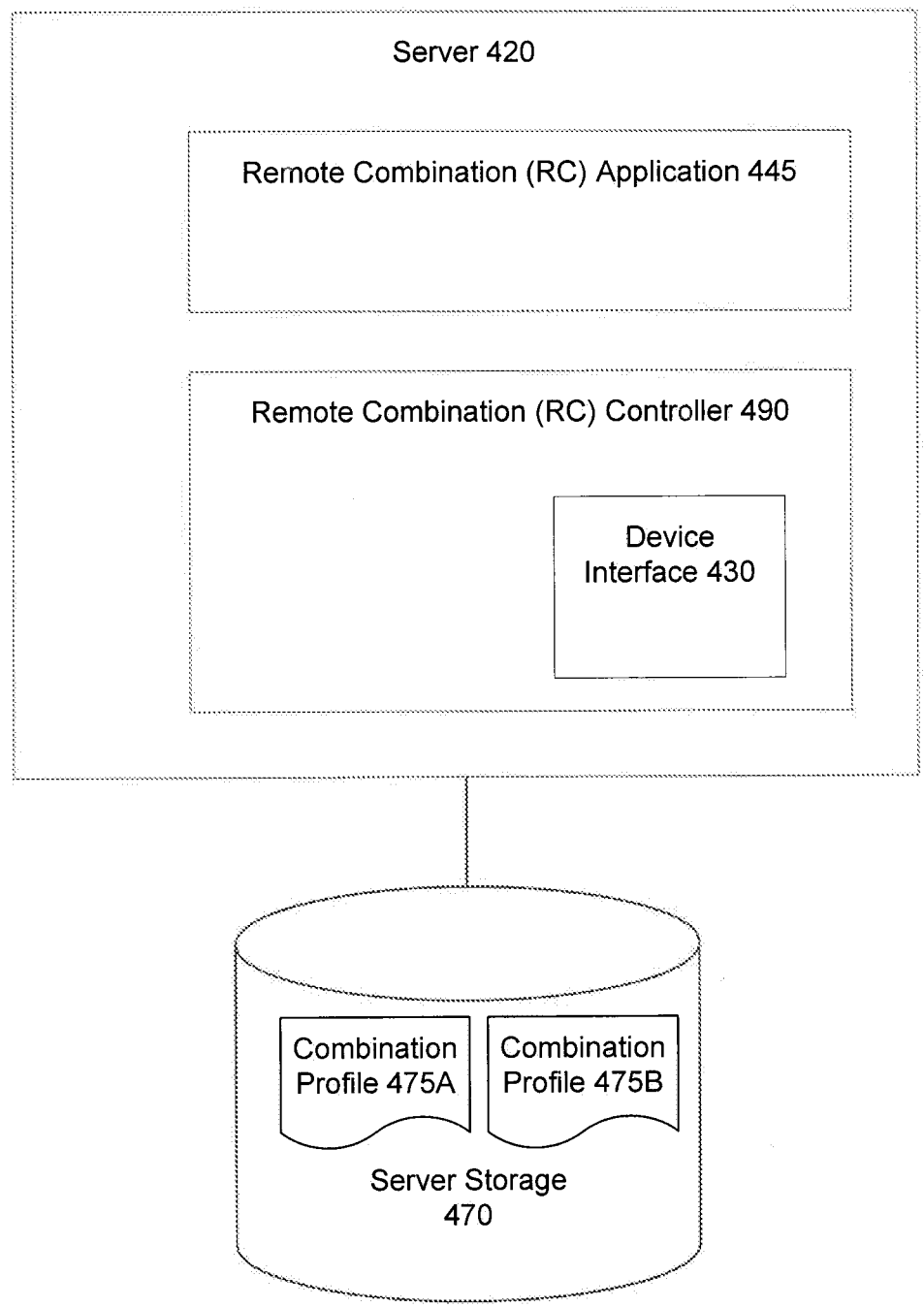
FIG. 4 is diagram of a remote combination application (RCA) user interface, according to an embodiment.

FIG. 4 is a block diagram of a more detailed view of server 420 having remote combination controller 490, according to an embodiment. Server 420 is coupled to server storage 470, such server storage 470 having combination profiles 475A-B. Server 420 hosts remote combination (RC) application 445 and remote combination (RC) controller 490.

Remote combination controller uses combination profiles 475A-B to activate different combinations of functions on mobile device 110. Remote combination application receives indications from user 105 via client computer 150 and RCA user interface 146 from FIG. 1.

Figure 5:
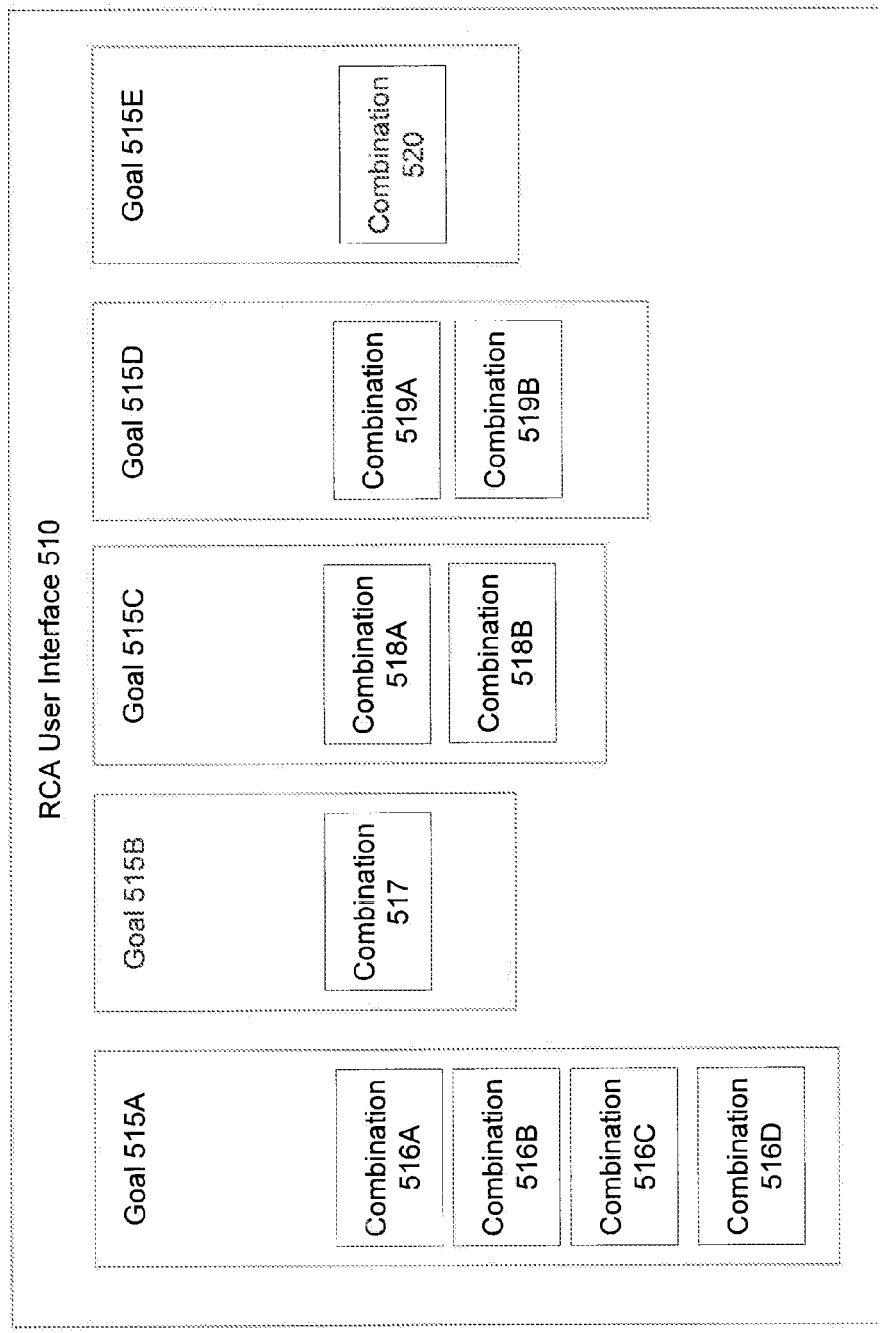
FIG. 5 is another block diagram of the user interface of a network-based application to an embodiment.

FIG. 5 is a diagram of an example user interface of RC application user interface 510. RC application user interface shows goals 515A-B, each goal 515A-E having respective combinations 516A-C, 517, 518A-B, 519A-B and 520.

As discussed farther below with respect to FIG. 6, goals 515A-E can provide a useful approach to grouping combinations 516A-C, 517, 518A-B, 519A-B and 520. User 105, when using RC application user interface 510, can quickly locate the combinations potentially helpful for a particular situation. As would be appreciated by one having skill in the relevant art(s), given the description herein, combinations can appear grouped in one or more goals, combinations need not be grouped to be used within an interface and additional goals can be addressed using the teachings herein.

Goals 515A-E and associated combinations are discussed further below.

Goal 515A: Respond to Lost Device

Figure 6:
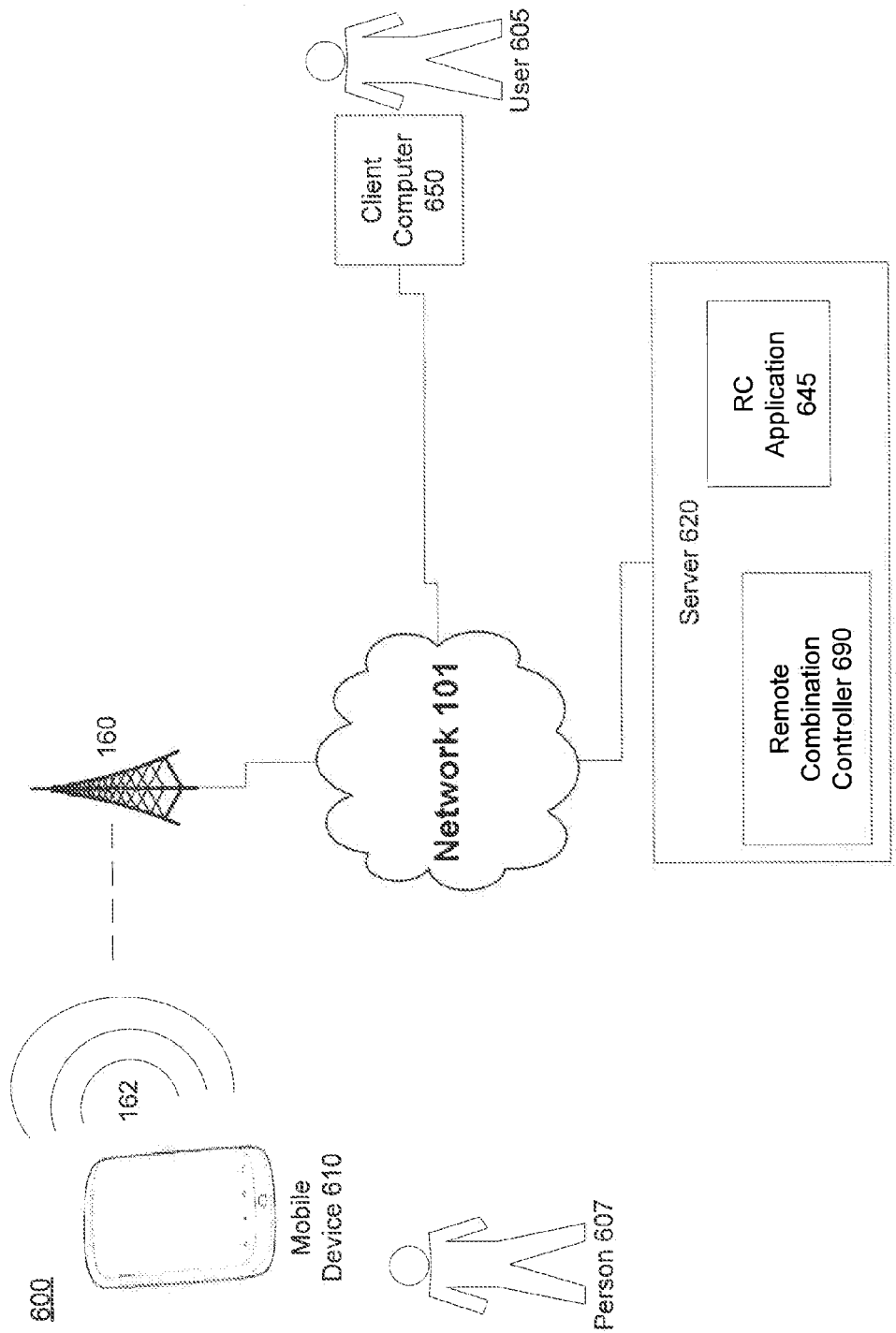
FIG. 6 is another block diagram depicting an example network application architecture, according to an embodiment.

FIG. 6 depicts an example network application architecture 600 in which embodiments, or portions thereof, may be implemented. Network application architecture 600 includes the following components linked by network 101: server 620, wireless transceiver 160, and client computer 650. Mobile device 610 is linked by wireless signal 162 to wireless transceiver 160. Client computer 650 includes an interface, e.g., RC application user interface 510 to RC application 645. Server 620 has RC controller 690 and RC application 645. User 605 is shown with client computer 650 and person 607 is shown with mobile device 610.

In an example shown in FIG. 6, mobile device 610 is owned by user 605, and is lost or misplaced. In an embodiment described herein, mobile device 610 is in the possession of person 607, and in another embodiment, mobile device 610 is not possessed by anyone. In variations of an embodiment described above, person 607 may or may not intend to return mobile device 610 to User 605.

Based on the example detailed with respect to FIG. 6 above, user 605 has a goal of regaining possession of mobile device 610. Different combinations of device functions potentially useful to this end are discussed with respect to FIGS. 7-10 below. Using RC application user interface 510, user 605 selects from combinations 516A-D displayed grouped with goal 515A—responding to lost device.

For devices without constant data connections, you could also log lots of input info to be uploaded at the next connection (e.g. wifi or wired)

Combination 516A: Power-Saver

Figure 7:
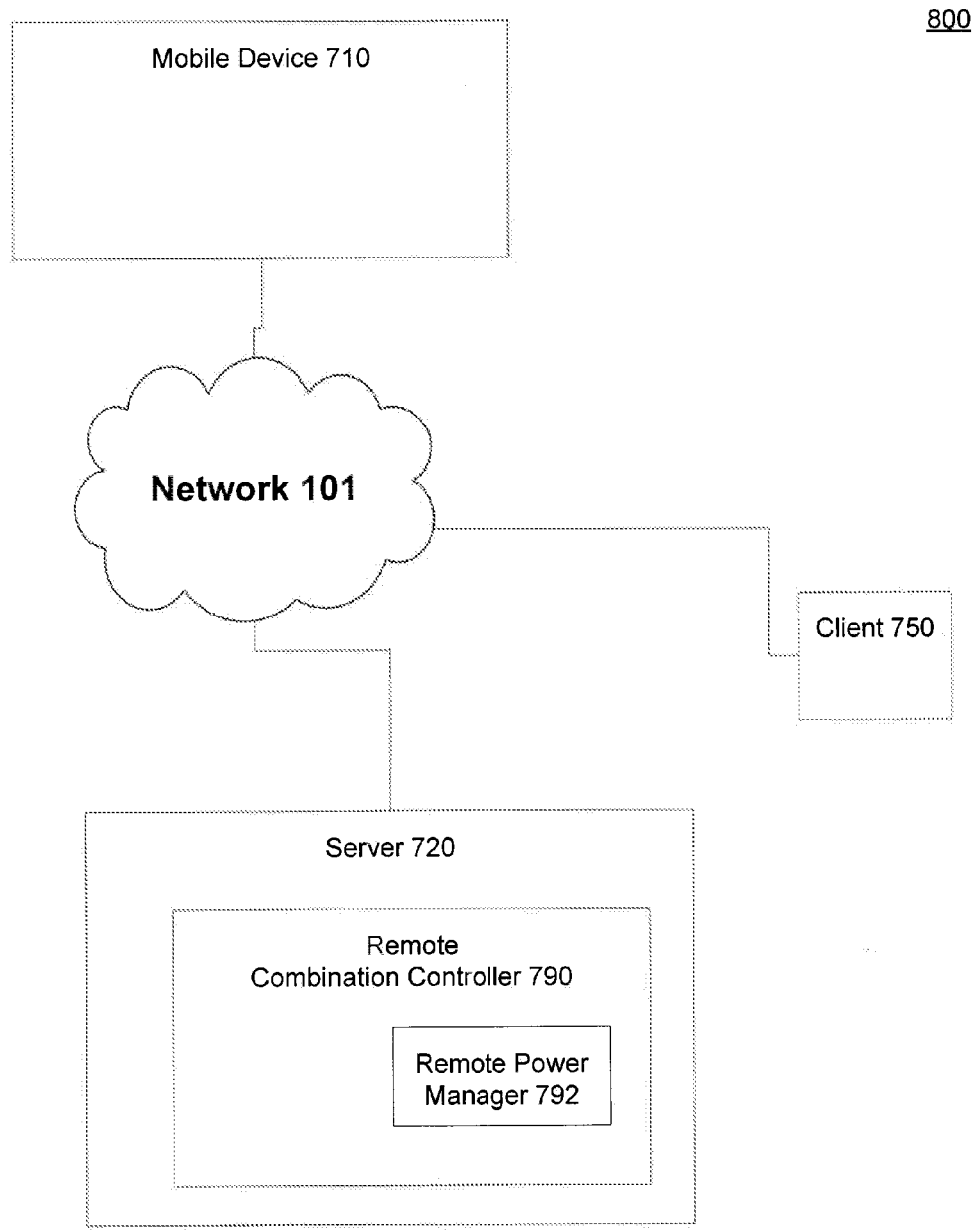
FIG. 7 is a detailed view of a remote combination controller having a remote power manager, according to an embodiment.

FIG. 7 depicts a detailed view of RC controller 790 in an example network application architecture 700, according to an embodiment. Network application architecture 700 has mobile device 710, network 101, client 750 and server 720. Server 720 has RC controller 790 with remote power manager 792.

In an embodiment, a combination of features can be remotely activated on a mobile device that is tailored to conserve battery life. Based on the power characteristics of mobile device 710, remote power manager 792 can remotely manage remaining battery power on the device. In an example, person 607 does not have the accessories or intent to charge mobile device 610. Because available power is necessary to perform other mobile device functions described herein, the power saver combination may also be used with other function combinations discussed with respect to FIGS. 8-10 below.

Different input and output function components can be activated in combination to perform the power-saver function.

Power manager 355: Because power savings may not be configured to function on lost mobile device 610, this function can be activated and configured remotely, in an embodiment.

Remote power manager 792: As noted above, mobile device 110 may already have a component (power manager 355) designed to conserve power on the device. In an embodiment, remote power manager 792 can be specifically configured to conserve power in a lost/misplaced mobile device. Instead of conserving power with functions enabled as is generally performed by power manager 355, remote power manager 792 can have different power savings approaches configured—such approaches designed to enable useful locating functions, for example, GPS 225, while disabling functions that may not by helpful to searching user 605, for example, dialer 345. In another embodiment, the functions described with respect to FIGS. 8-10 below can be performed while power management approaches enforced by power manager 355 are controlling.

Device status controller 360: As described above with respect to FIG. 3, device status controller 360 can control the status, for example powered on or off, of mobile device 710. An embodiment uses RC controller 790 to power off mobile device 710 for power savings—powering the device on periodically to perform different useful locating functions, as discussed with respect to FIGS. 8-10 below.

Battery meter 275: This input function can be used by an embodiment of the power saver combination 516A to monitor the status of the battery of mobile device 710. As would be appreciated by one having skill in the relevant art(s), given the description herein, remote power manager 792 can use the information of battery meter 275 to use different battery savings approaches on mobile device 710.

Combination 516B Identify Location by Visual Characteristics

Figure 8:
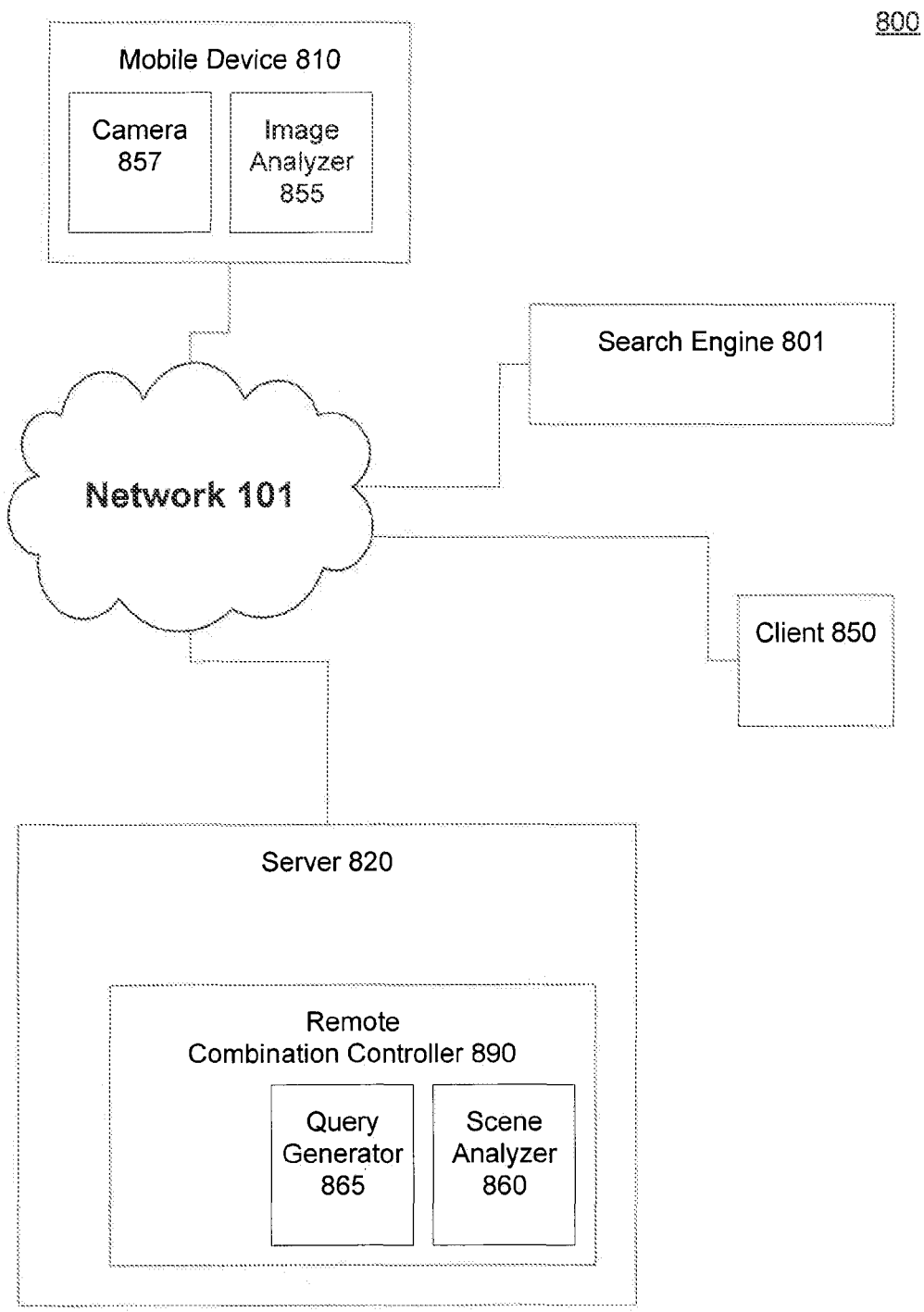
FIG. 8 is a detailed view of a remote combination controller with a scene analyzer and a query generator, according to an embodiment.

FIG. 8 depicts a detailed view of RC controller 890 in an example network application architecture 800, according to an embodiment. Network application architecture 800 has mobile device 810, network 101, client 850, search engine 801 and server 820. Server 820 has RC controller 890 with query generator 865 and scene analyzer 860. Mobile device 810 has camera 857 and image analyzer 855.

In an embodiment, a combination of features can be remotely activated on a mobile device that is tailored to identify the current location of the mobile device using visual characteristics. Generally speaking, this combination of features uses mobile device input feature components to capture characteristics of the current location of the mobile device. Input feature components used in combination can include cameras 250A-B, microphone 245, Bluetooth antenna 265, thermometer 240 and compass 220. This list of example input function components is intended to be non-limiting, and embodiments can use additional or fewer components to perform combination functions listed below.

GPS-based location determination may not be available at all times to identify the location of the mobile device. Indoor locations and locations within "urban canyons" can act to block the geographic location determining functions of GPS devices. An embodiment uses a combination of other input function components to estimate the location of the mobile device.

For example, when this combination is activated, input function controller 290 directs camera 250A (in this example, a "rear-facing" mobile device camera) to capture a digital picture. This captured picture may not provide any useful information—e.g., when the mobile device is up against a person's head, in a pocket or car glove compartment. Because of the orientation of the mobile device, the captured picture may show the outdoor or indoor scene where the mobile device is located. In a variation of the embodiment where camera 250A captures a digital picture, camera 250A can be used to capture a video of the surrounding environment. As would be appreciated by one having skill in the relevant art(s), given the description herein, this video may provide lower image quality, but because of its continuous nature, have more information about the environment. In the embodiments using digital pictures discussed below, a video can also be used, with potential differences in quality and information.

In a variation of this example, to improve the quality of the captured image, at the time camera 857 is set to take the digital image, output function controller 390 can direct camera flash 335 to be used. In another variation, camera flash 335 is not used because its use could alert a person possessing the mobile device to the digital picture capture.

Continuing this example, using the wireless data transfer functions of the mobile device, the digital image is sent to server 820. Because of the battery usage associated with sending data wirelessly from the mobile device, in a variation of this example, before sending, the digital image is analyzed by scene analyzer 860, such analysis determining whether the digital image contains useful scene information. One having skill in the relevant art(s), given the description herein, will appreciate that scene analyzer 860 can use various approaches to determining whether the digital image is likely to show the surroundings of mobile device 810. By not sending a useless digital image, battery life on the mobile device can be saved.

Continuing this example, once received by server 820, the digital image can be forwarded to RC application 145 for viewing by the mobile device owner. Identifying a location from a digital image can be difficult however, and an embodiment provides additional functions to this end.

In an embodiment, once the digital image is received by server 820, the digital image is analyzed by scene analyzer 860 to identify location characteristics from the captured scene. Example location characteristics that could be identified include buildings, signs, places of business and vehicles, e.g., planes, trains, boats, and buses. At this stage, in an embodiment, location characteristics are identified as useful characteristics, but their significance is not yet identified.

To identify the significance of the identified location characteristics, an embodiment uses search resources, for example a search engine. Using the identified location characteristics, query generator 865 generates a query for submission to search engine 801. In embodiments, the query may be textual, e.g., generated from a road sign characteristic, or visual, e.g., a cropped picture of a building from the captured digital image.

Once results are generated by the utilized search resource, e.g., search engine 801, the search results can be forwarded via device interface 430, along with the captured digital image and/or the identified location characteristics, to RC application 145 for viewing by device owner.

In a variation of the above embodiments, additional input feature components can also be used to capture location characteristics for location identification. Items LC1-LC4 below are intended to be non-limiting examples of the uses of different components:

LC1. Thermometer 240: In certain circumstances, thermometer 240 may provide useful location characteristics, e.g., whether the mobile device is inside or outside.

LC2. Compass 220: By annotating the captured image with a facing direction, additional picture interpretation information can be provided to search engine 801 and device owner.

LC3. Bluetooth Antenna 260: Detecting the presence of Bluetooth signals can give an indication of how public a location the mobile device is in. Presumably, a location with several detected Bluetooth signals has a higher density of people nearby.

LC4. Camera 857: As noted above, camera 857 can also capture video of the environment. When video is available, scene analyzer 860 can use frame captures to identify location characteristics. Other known video analysis approaches can also be used.

As would be appreciated by one having skill in the relevant art(s), given the description herein, additional mobile device functions can also be used to capture characteristics of a location.

Combination 516C: Disruption

Figure 9:
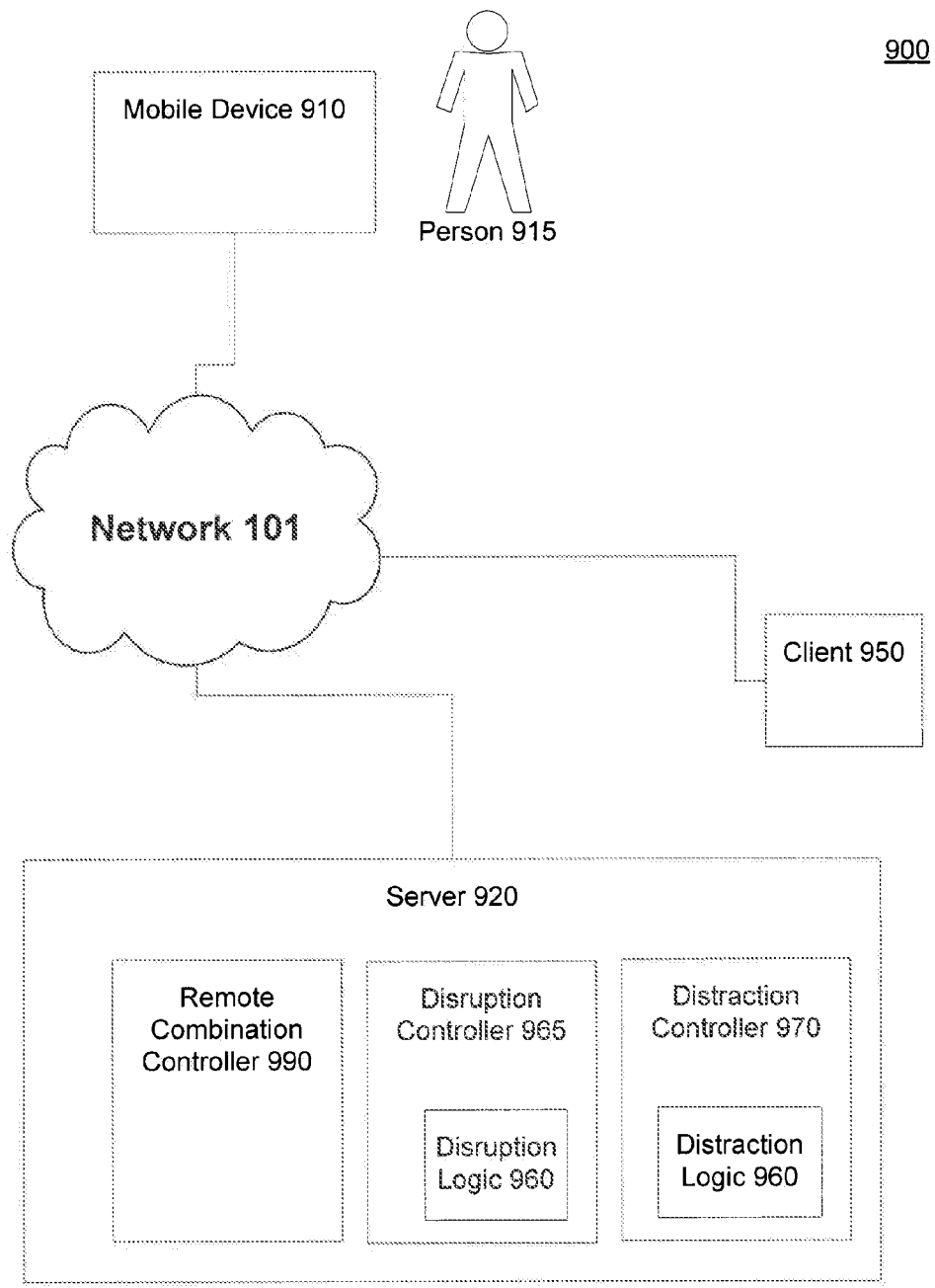
FIG. 9 is a detailed view of a remote combination controller with disruption logic, according to an embodiment.

FIG. 9 depicts a detailed view of RC controller 990 in an example network application architecture 900, according to an embodiment. Network application architecture 900 has mobile device 910, network 101, client 950 and server 920. Server 920 has RC controller 990 and disruption controller 965 with disruption logic 960. Person 915 is shown with mobile device 910. Server 920 also has distraction controller 970 having distraction logic 960. These distraction components are described with reference to goal 515C—remote distraction, below.

In an embodiment, a combination of features can be remotely activated on a mobile device that are tailored to make the mobile device disruptive to people around it. Generally speaking, this combination of features uses output feature components to make the device disruptive to people nearby, e.g., by generating disruptive sounds, playing disruptive music, firing the camera flash, displaying disruptive pictures on the mobile device screen and/or using the vibration motor to vibrate the mobile device. Input feature components are used to inform disruption controller 965 about the current position of the mobile device. Disruption controller 965 is configured to use the provided sensory input to time the use of the output feature components for enhanced disruption. Disruption logic 960 can be used to select combinations of device features that can cause disruption. Examples IR1-IR2 are an illustrative and non-limiting list of combinations of features that can be used to generate disruptive output. Examples IR1-IR2 are listed below:

IR1. Proximity sensor 270 and speakerphone speaker 315 combination: Based on a determination by proximity sensor 270 that the mobile device is likely close to a person, disruption controller 965 can send an instruction to direct mobile device speakers, to play a loud noise.

IR2. Light sensor 280 and microphone 245 combination: Based on the current time of day, for example, 2 AM, a measurement by light sensor 280 that the surroundings are dark, and a measurement by microphone 245 that the surroundings are quiet, disruption controller 965 can send an instruction to play a loud, disturbing noise, for example, an alarm clock. Camera flash 335 can also be used to provide disruptive light output.

One having skill in the relevant art(s), given the description herein, will appreciate additional disruptive uses for output function components and additional useful input information that can be provided by input function components.

Combination 516D: Identify Location by Other Sensors

In an embodiment, a combination of features can be remotely activated on a mobile device that is tailored to identify the current location of the mobile device using additional sensors from those discussed with combination 516B above.

Thermometer

In one example thermometer 240 is used to measure the ambient temperature of mobile device 210. Using the wireless data transfer functions of mobile device 210, the measured temperature is sent to server 820. Once received by server 820, the measured temperature can be forwarded to RC application 145 for viewing by the owner of mobile device 210. Identifying location information from temperature alone can be difficult however, and an embodiment provides additional functions to this end.

In an embodiment, the remotely measured temperature on lost mobile device 210 can be combined with other sensor information gathered by the mobile device, e.g., sensors discussed with combination 516B above. For example, a temperature reading can be used to estimate whether the device is in a person's pocket. Combining the measured temperature with an estimated weather forecast can allow an embodiment to identify whether mobile device 210 is exposed to weather elements, inside, or in a bag, etc. This information, for example, when combined with a more precise location estimate, can allow an mobile device owner to have more pinpoint information about the location of mobile device 210.

In other embodiments, a temperature measurement can provide a basis for a geographic location estimate. When a temperature measurement is compared to weather forecasts, different potential geographic locations can be provided. Combining these provided potential geographic locations with photographic information discussed in combination 516C, for example, can provide additional accuracy to an estimated geographic location.

To identify the significance of the identified temperature characteristics, an embodiment uses search resources, for example a search engine. Using the measured temperature, query generator 865 can generate a query for submission to search engine 801.

Once results are generated by the utilized search resource, e.g., search engine 801, the search results can be analyzed and forwarded via device interface 430 for viewing by device owner.

Accelerometer

In another example, accelerometer 215 can be used to measure the movement of mobile device 210. Using the wireless data transfer functions of mobile device 210, the movement measurements are sent to server 820. Once received by server 820, the movement measurements can be forwarded to RC application 145 for viewing by the owner of mobile device 210. Identifying location information from movement alone can be difficult however, and an embodiment provides additional functions to this end.

In an embodiment, the movement measurements on lost mobile device 210 can be combined with other sensor information gathered by the mobile device, e.g., sensors discussed with combination 516B above. For example, a movement measurements can be used to estimate whether the device is in a moving vehicle, or being carried by a person walking/ running. Combining the measured movement information with other, more precise geographic measurements can allow an mobile device owner to have more pinpoint useful information about the current location of mobile device 210. For example, when an owner of lost mobile device 210 checks a geographic area for their lost device, knowing that the device is likely being carried by a person walking may be helpful.

Pressure Sensor

In another example, pressure sensor 205 can be used to measure the ambient barometric pressure/altitude of mobile device 210. Using the wireless data transfer functions of mobile device 210, the pressure measurements are sent to server 820. Once received by server 820, the pressure measurements can be forwarded to RC application 145 for viewing by the owner of mobile device 210. Identifying location information from pressure measurements alone can be difficult however, and an embodiment provides additional functions to this end.

In an embodiment, the pressure measurements on lost mobile device 210 can be combined with other sensor information gathered by the mobile device, e.g., sensors discussed with combination 516B above. For example, pressure measurements can be used to estimate whether the device is gaining or losing altitude. Depending on the speed of the pressure changes, an assessment can be made by an embodiment that mobile device 210 is in a tall building or at ground level. Such altitude measurements can be essential in finding a device in an urban environment, where geographic locations may have large vertical components.

In another embodiment, the measured pressure can be used to track the changes in altitude of lost device 210 over time. Rapid changes in altitude can lead to an estimation that mobile device 210 is in an airplane. This airplane estimation can also be provided based on the measured altitude alone, e.g., no buildings exist at 29,000 feet above sea level. Because altitude measurements in airplanes may not be able to be transferred in real-time, an embodiment can store measurements and transfer them to server 820 when connectivity is reestablished. One having skill in the relevant art(s), given the description herein, will appreciate that all types of sensor measurements described herein can be stored and sent to server 820 in this delayed fashion.

Goal 515B: Child Monitor

Figure 10:
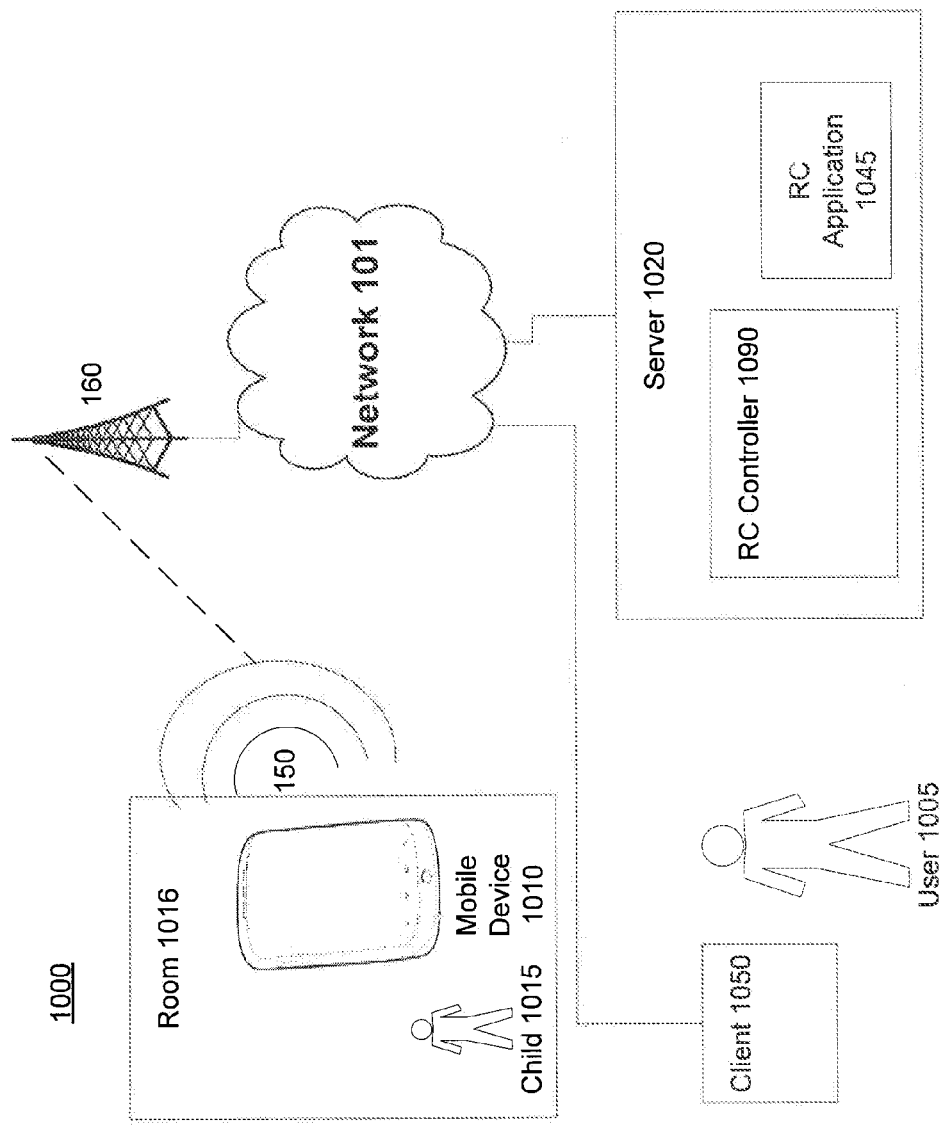
FIG. 10 is another block diagram depicting an example network application architecture with a remote combination controller, according to an embodiment.

FIG. 10 depicts a detailed view of RC controller 1090 in an example network application architecture 1000, according to an embodiment. Network application architecture 1000 has mobile device 1010, network 101, client 1050 and server 1020. Server 1020 has RC controller 1090. Child 1015 is shown with mobile device 1010 in room 1016. User 1005 is shown with client 1050.

Combination 517: Monitor Child

In an embodiment, a combination of features can be remotely activated on a mobile device that is tailored to allow the mobile device to perform child monitoring (also termed herein baby monitoring) functions. Generally speaking, this combination of features uses input and output feature components to make the mobile device relay information about the status of a child.

In an example embodiment, a guardian (e.g., user 1005) deems as requiring monitoring, child 1015 in room 1016. As discussed further below, different options can be used to situate mobile device 1010 in room 1016. Example monitoring features M1-M5 are listed below as examples of features that can be remotely activated by embodiments, either alone or in combination. Features M1-M5 are listed below:

M1. Microphone 245: Microphone 245 can be activated to capture and relay ambient sound from room 1016 to server 1020 and RC application 1045. As discussed above with respect to FIG. 4, RC application 1045 relays the captured ambient sound to client 1050 where it can be presented to user 1005 via an RCA interface, e.g., RCA user interface 146 from FIG. 1.

M2. Accelerometer 215: In another embodiment, mobile device 1010 can be arranged in room 1016 so that additional input functions of mobile device 1010 can provide useful information. For example, attaching mobile device 1010 to a crib where child 1015 is placed (not shown) could enable accelerometer 215 input function to gather child 1015 movement information. When this movement information is combined with the audio information collected by microphone 245 a more complete status of child 1015 can be relayed to client 1050 by RC application 1045.

M3. Light Sensor 280: In a variation of the above embodiments, light sensor 280 in mobile device 1010 can be activated with a combination of other mobile device 1010 functions (e.g., microphone 245 and/or accelerometer 215). Light sensor 280 can provide information about ambient light in room 1016. As would be appreciated by one having skill in the relevant art(s), given the description herein, combining knowledge of stimuli in room 1016, such as ambient light, can help user 1005 to determine whether child 1015 requires personal attention.

M4. Proximity Sensor 270: In a variation of the above embodiments, proximity sensor 270 in mobile device 1010 can be activated with a combination of other mobile device 1010 functions (e.g., microphone 245 and/or accelerometer 215). Proximity sensor 270 can provide information about objects in proximity to mobile device 1010. As noted above with the discussion of accelerometer 215 in this section, mobile device 1010 can be arranged in such a fashion as to allow additional input functions to collect information. Depending upon the sensitivity of proximity sensor 270 and fashion in which it has been mounted in room 1016, proximity sensor 270 can provide information as to whether child 1015 is moving or has moved. As discussed herein, the individual pieces of information collected by input functions may not provide a useful status of child 1015. The combination of activated functions however, can provide a more complete status.

M5. Speakerphone Speaker 315: In an embodiment, speakerphone speaker 315 in mobile device 1010 can be activated to play soothing sounds. The soothing sounds can be activated by the user or automatically, in response to sounds detected using feature M1 described above.

Goal 515C: Remote Distraction

As noted above, server 920 from FIG. 9 also has distraction controller 970 having distraction logic 960. In a variation of the embodiment shown in FIG. 9, a combination of features can be remotely activated on mobile device 910 that are tailored to make the mobile device distracting to people around it for a period of time.

For example, by generating distinctive sounds, playing music, firing the camera flash, displaying pictures on the mobile device screen and/or using the vibration motor to vibrate the mobile device, the mobile device can be made distracting to people around.

In one example use, the owner of mobile device 910 wants to distract person 915 for a period of time so as to set up an enjoyable surprise for person 915. Using an embodiment to this end, the owner of mobile device 910 hides mobile device in a location proximate to person 915. In this example, the owner of mobile device 910 wants to leave a gift for person 915 in the entryway to their house. Mobile device 910 is hidden in the back of the house belonging to person 915, and configured, via RC controller 990, to make mobile device 910 distracting.

Distraction logic 960 can use output function controller 390 to control output functions such as speakerphone speaker 315, ringer speaker 340, light 330A, screen display 325, and vibration motor 320 to make mobile device 910 produce distracting output in its hidden location. While person 915 is distracted by output generated by mobile device 910, the owner of mobile device 910 can place the surprise gift. Different Combination 518A can be distraction using only audible output components (e.g., speakerphone speaker 315, ringer speaker 340), and combination 518B can be distraction using a combination of audible and visual output components (e.g., ringer speaker 340, light 330A, screen display 325). One having skill in the relevant art(s), given the description herein, will appreciate additional output function combinations that can be used by embodiments to accomplish different useful distracting applications.

Goal 515D: Remote Announcer

In an embodiment, a combination of features can be remotely activated on a mobile device that is tailored to make announcements using mobile device 910. Output feature components used in combination 519A to make announcements include speakerphone speaker 315, ringer speaker 340, lights 330A-B, screen display 325, and vibration motor 320. The speaker components (315, 340) can be used to make the announcements and a combination 519B of visual components (lights 330A-B, screen display 325) can be used to alert an audience that an announcement is forthcoming. Vibration motor 320 can also be used.

In different embodiments, announcements can be ad-hoc, or scheduled. For example, the owner of mobile device 910 may want to make scheduled and ad-hoc announcements to a person 915 for which they have care responsibility. The need to take a medicine at a particular time is a scheduled announcement that can be performed on mobile device 910 using RC controller 990. Scheduled announcements can call out the time every hour, on the hour, or alert person 915 that bed time is soon.

An ad-hoc announcement example would be a suggestions that person 915 watch a particular television show. This list of example output function components and announcements is intended to be non-limiting, and embodiments can use additional or fewer components to perform different types of announcements.

Goal 515E: Active Frame

In an embodiment, a combination of features can be remotely activated on a mobile device that is tailored to have mobile device 910 become an active display frame. This active display frame can be addressable by network 101 and server 920. Using RC controller 990, pictures & video (live and recorded) can be displayed on mobile device 910. Other examples allow applications to be delivered to mobile device 910 and installed thereon. In this example, mobile device 910 acts as a hilly addressable multimedia terminal you could use for advertising, public safety announcements, etc.

Combination 520 on FIG. 5 is an example combination of screen display 325, speakerphone speaker 315, ringer speaker 340, lights 330A-B, screen display 325, and vibration motor 320 that can be configured to perform multimedia terminal functions. One having skill in the relevant art(s), given the description herein, will appreciate how different output functions can be combined and used to perform a broad variety of active frame functions.

Method

Figure 11:
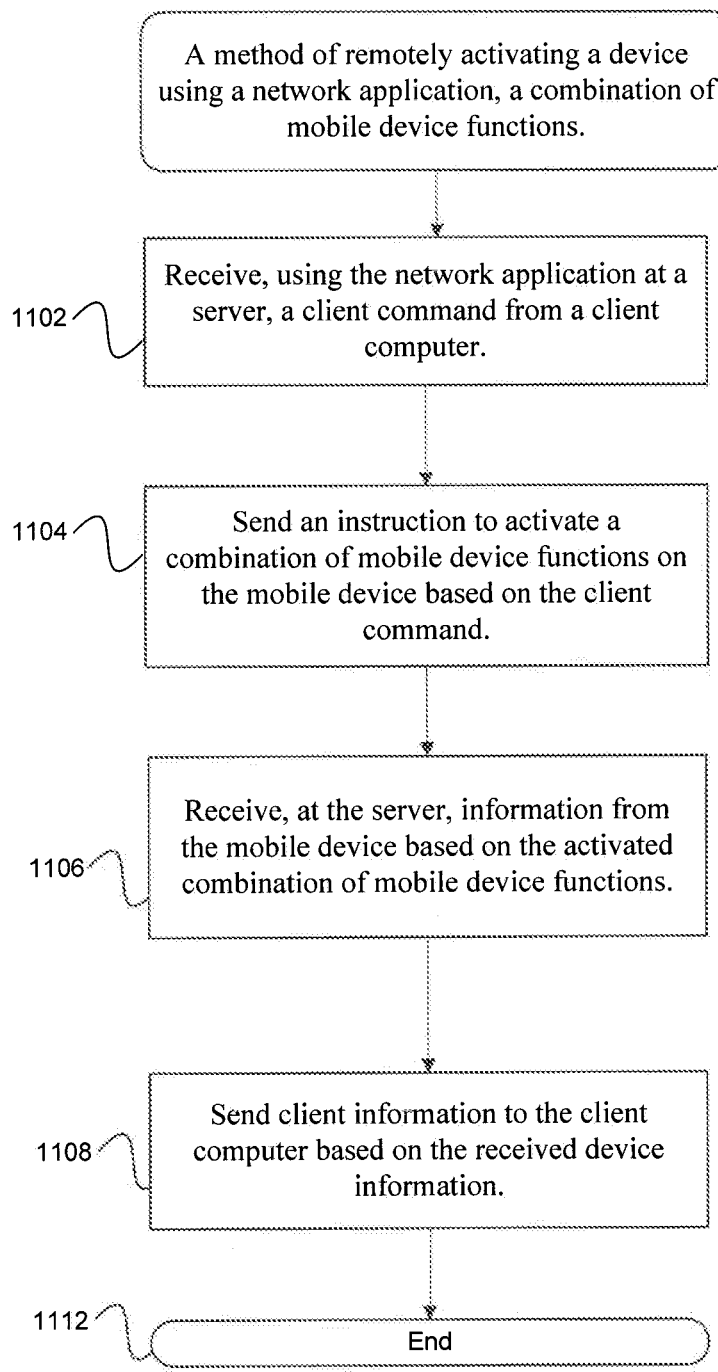
FIG. 11 shows a flowchart illustrating a method of remotely activating, using a network application, a combination of functions on a mobile device, according to an embodiment.

FIG. 11 illustrates an exemplary method 1100 of remotely activating a device using a network application, a combination of mobile device functions.

As shown in FIG. 11, method 1100 begins at stage 1102 where the network application at a server is used to receive a client command from a client computer. In an embodiment, RC application 145 at server 120 receives a client command from RCA user interface 146 operating in web browser 140 on client computer 150. The client command corresponds to a command to identify a location of the mobile device using visual characteristics. In another embodiment, the client command corresponds to a command to manage power consumption on the mobile device. In yet another embodiment, the client command corresponds to a command to make the mobile device disruptive. In another embodiment, the client command corresponds to a command to monitor the surroundings of a mobile device. Once stage 1102 is, complete, method 1100 proceeds to stage 1104.

At stage 1104, a combination of mobile device functions is activated on the mobile device based on the client command. For example, a combination of mobile device functions including camera 857 from FIG. 8 and camera flash 335 from FIG. 3 are activated on the mobile device based on the client command to identify the mobile device location by visual characteristics. Camera 857 is directed to take a picture of the mobile device surroundings and camera flash 335 is set to flash, if required.

In another example, a combination of mobile device functions including battery meter 275, power manager 355 and device status controller 360 from FIGS. 2 and 3 are activated on the mobile device based on the client command to manage power consumption on the mobile device.

In yet another example, a combination of sensors on the mobile device to capture characteristics of the surroundings of the mobile device, e.g., based on a client command to make the mobile device disruptive, from FIG. 2, a combination of microphone 245, cameras 250A-B, proximity sensor 270, accelerometer 215 and light sensor 280 can be activated.

In another example of an activation of a combination of mobile device functions, a combination of input components on the mobile device can be activated to capture information related to the surroundings of the mobile device, such activation based on a client command to remotely monitor the surroundings of a mobile device, e.g., a combination of microphone 245, cameras 250A-B, proximity sensor 270, accelerometer 215 and light sensor 280 can be activated. Once stage 1104 is complete, method 1100 proceeds to stage 1106.

At stage 1106, at the server, information is received from the mobile device based on the activated combination of mobile device functions. In the example where a command to identify a location of the mobile device using visual characteristics is received, the picture captured by camera 857 is received by remote combination controller 890 on server 820.

In the example where a command to manage power consumption on the mobile device is received, information from the mobile device describing the remaining battery power and power consumption can be collected by battery meter 275, power manager 355 and device status controller, and relayed to remote power manager 792 in FIG. 7.

In the example where a command to make the mobile device disruptive is received, information from the mobile device describing the surroundings of the mobile device can be received from microphone 245, cameras 250A-B, proximity sensor 270, accelerometer 215, and light sensor 280. Disruption logic 960 can use visual information collected by cameras 250A-B (e.g., it is dark), and audio information from microphone 245 (e.g., it is quiet), to determine that a loud noise produced by speakerphone speaker 315 and a bright light produced by camera flash 335 is likely to be disruptive to a proximate mobile device 310 user.

In the example where a command to monitor the surroundings of a mobile device is received, information from the mobile device can include an audio stream from mobile device 210 captured by microphone 245 and a video stream from mobile device 210 captured by camera 250A. Once stage 1106 is complete, method 1100 proceeds to stage 1108.

At stage 1108, client information is sent to the client computer based on the received information from the mobile device. For example, remote combination controller 890 uses scene analyzer 860 to analyze the received picture, and query generator 865 generates a query to search engine 801 based on the analysis. Based on the query, search engine 801 provides results including a likely location for mobile device 810. Finally, the likely location result is sent to client 850.

In the example where a command to manage power consumption on the mobile device is received, information from the mobile device describing the remaining battery power and power consumption collected by battery meter 275 is sent to client computer 150 to provide a mobile device user 105 with an updated status on the remaining battery power of the device.

In the example where a command to make the mobile device disruptive is received, updated information from the mobile device describing the surroundings of the mobile device can also be received. Using this updated information, user 105 can be provided with a confirmation that disruptive output actions were performed by mobile device 110.

In the example where a command to monitor the surroundings of a mobile device is received, information sent to client computer 150 from the mobile device can include the previously noted audio stream captured by microphone 245 and video stream captured by camera 250A. After the completion of stage 1108, method 1100 ends.

Example Computer System Implementation

Figure 12:
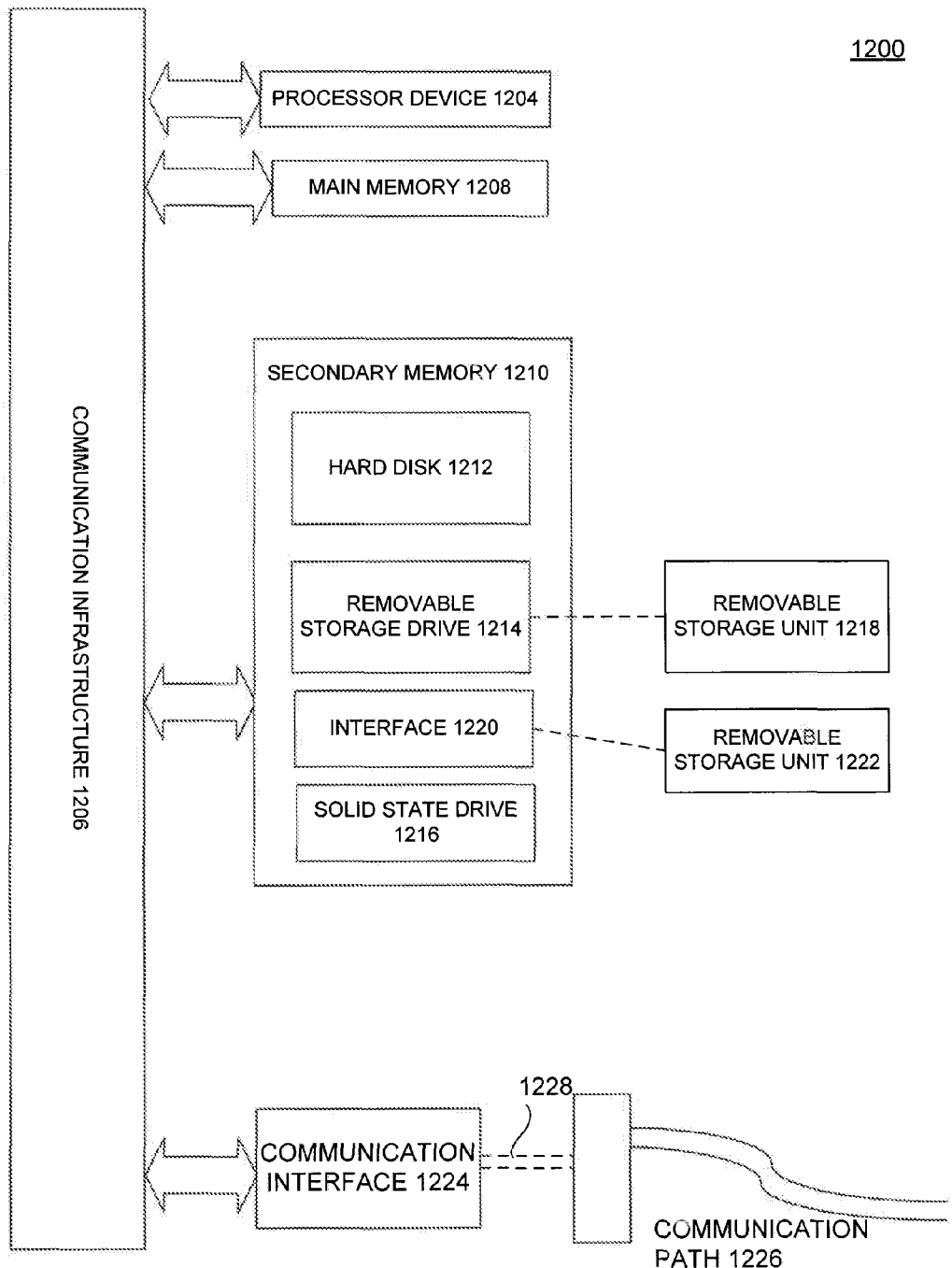
FIG. 12 depicts a sample computer system that may be used to implement an embodiment.

FIG. 12 illustrates an example computer system 1200 in which embodiments, or portions thereof, may be implemented. For example, portions of systems or methods illustrated in FIGS. 1-11 may be implemented in computer system 1200 using hardware, software, firmware, tangible computer readable media having instructions stored thereon, or a combination thereof, and may be implemented in one or more computer systems or other processing systems. Hardware, software or any combination of such may embody any of the modules/components in FIGS. 1-10 and any stage in FIG. 11. Mobile devices (110, 210, 310, 610, 710, 810, 910, 1010), servers (120, 420, 620, 720, 820, 920, 1020), client computers (150, 650, 750, 850, 950, 1050) and search engine 801 can also be implemented using components of computer system 1200.

One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments are described in terms of this example computer system 1200. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1204 may be a single processor in a multi-core/multiprocessor system, such system operating alone, or in a cluster of computing devices operating in a cluster or server farm. Processor device 1204 is connected to a communication infrastructure 1206, for example, a bus, message queue, network or multi-core message-passing scheme.

Computer system 1200 also includes a main memory 1208, for example, random access memory (RAM), and may also include a secondary memory 1210. Secondary memory 1210 may include, for example, a hard disk drive 1212, removable storage drive 1214 and solid state drive 1216. Removable storage drive 1214 may include a floppy disk drive, a magnetic tape drive, an optical disk drive, a flash memory, or the like. Removable storage drive 1214 reads from and/or writes to a removable storage unit 1218 in a well known manner.

Removable storage unit 1218 may include a floppy disk, magnetic tape, optical disk, etc. which is read by and written to by removable storage drive 1214. As will be appreciated by persons skilled in the relevant art, removable storage unit 1218 includes a computer readable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 may be in electronic, electromagnetic, optical, or other forms capable of being received by communications interface 1224. This data may be provided to communications interface 1224 via a communications path 1226. Communications path 1226 carries the data and may be implemented using wire or cable, fiber optics, a phone line, a cellular phone link, an RF link or other communications channels.

In this document, the terms "computer program medium" and "computer readable medium" are used to generally refer to media such as removable storage unit 1218, removable storage unit 1222, and a hard disk installed in hard disk drive 1212. Computer program medium and computer readable medium may also refer to memories, such as main memory 1208 and secondary memory 1210, which may be memory semiconductors (e.g., DRAMs, etc.).

Computer programs (also called computer control logic) may be stored in main memory 1208 and/or secondary memory 1210. Computer programs may also be received via communications interface 1224. Such computer programs, when executed, enable computer system 1200 to implement embodiments as discussed herein. In particular, the computer programs, when executed, enable processor device 1204 to implement the processes disclosed, such as the stages in the method illustrated by flowchart 1100 of FIG. 11 discussed above. Accordingly, such computer programs represent controllers of the computer system 1200.

Embodiments also may be directed to computer program products comprising software stored on any computer readable medium. Such software, when executed in one or more data processing devices, causes a data processing device(s) to operate as described herein. Embodiments can employ any computer useable or readable medium. Examples of computer readable media include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

CONCLUSION

Embodiments described herein relate to remotely activating a combination of mobile device functions using a network application. The summary and abstract sections may set forth one or more but not all exemplary embodiments as contemplated by the inventors, and thus, are not intended to limit the present disclosure and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the claims and their equivalents.

What is claimed is:

1. A method of identifying a location of a mobile device using visual characteristics, comprising:
   receiving, by a server, a client command to identify the location of the mobile device;
      sending, by the server, an instruction to activate a camera to capture a visual representation of an environment surrounding the mobile device;
   receiving, at the server, the captured visual representation;
   determining, by a scene analyzer executed by the server, location characteristics from the captured visual representation;
   identifying, by the server, based on the location characteristics from the captured visual representation, the location of the mobile device, wherein the identifying includes utilizing a search resource to determine a significance of the location characteristics; and
   sending the identified location of the mobile device to a client computer.

2. The method of claim 1, further comprising sending an instruction to activate a usefulness determiner on the mobile device that determines whether the captured visual representation is useful to determining the location of the mobile device, wherein the receiving, at the server, the captured visual representation only occurs when the visual representation is determined to be useful by the usefulness determiner.

3. The method of claim 1, further comprising sending an instruction to activate a camera flash as the camera captures the visual representation of the surrounding environment.

4. The method of claim 3, further comprising sending an instruction to activate a camera flash usefulness determiner to determine whether the camera flash will improve the quality of the visual representation, wherein the camera flash is only activated when the camera flash usefulness determiner determines that the camera flash is likely to improve the quality of the visual representation.

5. The method of claim 1, wherein sending an instruction to activate a camera to capture a visual representation of an environment surrounding the mobile device comprises sending an instruction to activate the camera to capture a video of the surrounding environment.

6. The method of claim 1, wherein the identifying, by the server, the location of the mobile device, wherein the identifying includes utilizing a search resource to determine a significance of the location characteristics comprises:
   generating a query based on the captured visual representation;
   submitting the query to a search engine; and
   receiving results from the search engine, wherein identifying the location of the mobile device is based on the results.

7. A system for remotely identifying a location of a mobile device using visual characteristics, comprising:
   a computer server;
   a remote combination controller on the computer server configured to:
      send an instruction to activate a camera to capture a visual representation of an environment surrounding the mobile device,
      receive the captured visual representation;
   a scene analyzer configured to analyze the received visual representation and identify location characteristics; and
   a query generator configured to generate a query based on the analysis by the scene analyzer, wherein the remote combination controller is further configured to submit the generated query to a search engine and receive results from the search engine, wherein an estimate of the mobile device location based on the received results is sent to the client computer using the network application.

8. A non-transitory computer readable storage medium having computer-executable instructions stored thereon that, when executed by a computing device, cause the computing device to perform a method of identifying a location of a mobile device using visual characteristics, the method comprising:
   receiving, by the computing device, a client command from a client computer to identify the location of the mobile device using visual characteristics;
      sending an instruction to activate a camera to capture a visual representation of an environment surrounding the mobile device;
   receiving, at the computing device, the captured visual representation;
   determining, by a scene analyzer executed by the computing device, location characteristics from the captured visual representation;
   identifying, by the computing device, based on the location characteristics from the captured visual representation, the location of the mobile device, wherein the identifying includes utilizing a search resource to determine a significance of the location characteristics; and
   sending the identified location of the mobile device to the client computer.

* * * * *